(12) United States Patent
Nakao et al.

(10) Patent No.: US 9,096,454 B2
(45) Date of Patent: Aug. 4, 2015

(54) MANUFACTURING METHOD FOR SHEET GLASS AND MANUFACTURING METHOD FOR GLASS SUBSTRATE

(71) Applicant: FURUKAWA ELECTRIC CO., LTD., Tokyo (JP)

(72) Inventors: Kousuke Nakao, Tokyo (JP); Toshiyuki Asai, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/212,433

(22) Filed: Mar. 14, 2014

(65) Prior Publication Data

US 2014/0196501 A1    Jul. 17, 2014

Related U.S. Application Data

(63) Continuation of application No. PCT/JP2012/071285, filed on Aug. 23, 2012.

(30) Foreign Application Priority Data

Nov. 10, 2011    (JP) .................................. 2011-246809

(51) Int. Cl.

| C03B 23/037 | (2006.01) |
|---|---|
| G01B 5/00 | (2006.01) |
| G01B 21/08 | (2006.01) |
| G01B 5/06 | (2006.01) |
| C03B 21/00 | (2006.01) |
| C03B 21/04 | (2006.01) |

(52) U.S. Cl.
CPC ............... *C03B 23/037* (2013.01); *C03B 21/00* (2013.01); *C03B 21/04* (2013.01); *G01B 5/00* (2013.01); *G01B 5/06* (2013.01); *G01B 21/08* (2013.01)

(58) Field of Classification Search
CPC .............................. C03B 23/037; C03B 21/00
USPC ....................................... 65/29.11, 29.14, 105
See application file for complete search history.

(56) References Cited

U.S. PATENT DOCUMENTS

| 4,361,431 A * | 11/1982 | Kandachi et al. .............. 65/99.5 |
|---|---|---|
| 6,385,998 B1 | 5/2002 | Mizuno |
| 8,107,856 B2 | 1/2012 | Gotoh et al. |

(Continued)

FOREIGN PATENT DOCUMENTS

| EP | 2 157 059 A1 | 2/2010 |
|---|---|---|
| JP | 6-305756 A | 11/1994 |

(Continued)

OTHER PUBLICATIONS

International Search Report issued on Nov. 13, 2012 for PCT/JP2012/071285 filed on Aug. 23, 2012 in English.

(Continued)

*Primary Examiner* — Queenie Dehghan
(74) *Attorney, Agent, or Firm* — Oblon, McClelland, Maier & Neustadt, L.L.P.

(57) ABSTRACT

A method of manufacturing a sheet glass includes: a re-draw process forming a sheet glass by, heating and softening a glass preform manufactured by float method, and extending the glass preform to a desirable plate thickness. An extension direction in which the glass preform is extended by the re-draw process is 90 degrees with respect to a direction in which molten glass is fed in the float method.

5 Claims, 8 Drawing Sheets

(56) References Cited

U.S. PATENT DOCUMENTS

| | | |
|---|---|---|
| 2006/0021385 A1 | 2/2006 | Cimo et al. |
| 2009/0113935 A1 | 5/2009 | Suzuki et al. |
| 2009/0324995 A1* | 12/2009 | Todo et al. ............ 428/846.9 |
| 2010/0242702 A1 | 9/2010 | Tanise et al. |
| 2011/0014428 A1 | 1/2011 | Nakamura |

FOREIGN PATENT DOCUMENTS

| | | |
|---|---|---|
| JP | 11-199255 A | 7/1999 |
| JP | 2000-203857 A | 7/2000 |
| JP | 2001-080929 A | 3/2001 |
| JP | 2006-244870 A | 9/2006 |
| JP | 2007-119290 A | 5/2007 |
| JP | 2008-508179 A | 3/2008 |
| JP | 2009-244870 A | 10/2009 |
| JP | 2010-030807 A | 2/2010 |
| JP | 2011-153059 A | 8/2011 |
| WO | 2008/136239 A1 | 11/2008 |
| WO | 2009/057474 A1 | 5/2009 |
| WO | 2009/119826 A1 | 10/2009 |
| WO | 2011/132646 A1 | 10/2011 |

OTHER PUBLICATIONS

Notice of Reasons for Refusal of Corresponding Japanese Application No. 2011-246809 (Mailed Feb. 12, 2013) with English Translation, 5 pgs.

* cited by examiner

MANUFACTURING METHOD FOR SHEET GLASS AND MANUFACTURING METHOD FOR GLASS SUBSTRATE

CROSS-REFERENCE TO RELATED APPLICATIONS

This application is a continuation of PCT International Application No. PCT/JP2012/071285 filed on Aug. 23, 2012 which claims the benefit of priority from Japanese Patent Application No. 2011-246809 filed on Nov. 10, 2011, the entire contents of which are incorporated herein by reference.

BACKGROUND OF THE INVENTION

1. Field of the Invention

The present invention relates to method for manufacturing a sheet glass formed by heating and extending a glass preform and method for manufacturing a glass substrate using the sheet glass.

2. Description of the Related Art

Conventionally, substrates of semiconductor elements, spacers used for field-effect-type flat panel displays or glass sheets used for magnetic disc substrates etc. require better thickness uniformness or surface roughness.

As a method of manufacturing a sheet glass having predetermined thickness and improved surface roughness, a method etc. of heating and softening a glass preform and extending it into a desirable thickness of sheet glass has been proposed (see Japanese Laid-open Patent Publication No. H11-199255).

SUMMARY OF THE INVENTION

It is an object of the present invention to at least partially solve the problems in the conventional technology.

In accordance with one aspect of the present invention, there is provided a method of manufacturing a sheet glass, the method includes: a re-draw process forming a sheet glass by, heating and softening a glass preform manufactured by float method, and extending the glass preform to a desirable plate thickness. An extension direction in which the glass preform is extended by the re-draw process is 90 degrees with respect to a direction in which molten glass is fed in the float method.

In accordance with another aspect of the present invention, there is provided a method of manufacturing a glass substrate includes sheet-glass-manufacturing process manufacturing a sheet glass by the method of manufacturing a sheet glass according to the present invention, and coring process coring in one line so that a center of the glass substrate is positioned substantially on a center in a width direction of the sheet glass.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of the present invention will be explained with reference to the drawings. Furthermore, in all the drawings of the embodiment hereafter, identical or equivalent elements are given same reference numerals. In addition, the present invention is not limited by the embodiment explained as follows.

Figure 1:
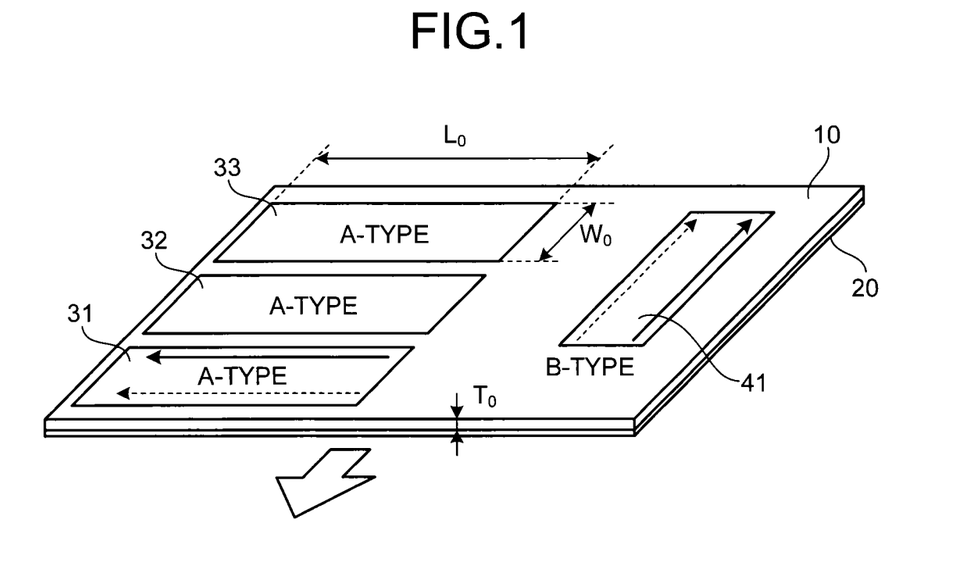
FIG. 1 is a diagrammatic view showing a float plate according to an embodiment of the present invention and two kinds of glass preforms cut out from the float plate.

At first, a method of manufacturing a sheet glass according to the embodiment of the present invention will be explained. FIG. 1 is a view schematically showing a glass preform used in the method of manufacturing a sheet glass according to this embodiment and a float plate from which the glass preform is cut out.

As shown in FIG. 1, at first, a float plate 10 manufactured by the float method is prepared. That is, the float plate 10 is formed by filling molten metal tin into a float bath (not shown) and flowing, on its surface, molten glass so as to float thereon. Furthermore, in FIG. 1, a hollow arrow indicates a flow direction of the molten glass as a flow direction of the float. This float method is capable of stable and inexpensive mass-production of large-area sheet glass. Furthermore, metal such as tin etc. as ion intrudes into a surface of one side of the float plate 10, making contact with the metal tin; thus a tin surface 20 is formed. This tin surface 20 may be removed.

Next, a material process is conducted by cutting this float plate 10 into a desirable size of glass preform. Glass preforms 31, 32, and 33 cut out in the material processing of cutting out these glass preforms 31 to 33 and 41 so that their longitudinal directions are disposed at 90 degrees with respect to the flow direction of the float are called "A-type glass preforms". On the other hand, the glass preform 41 cut out in the material processing so that its longitudinal direction is in parallel with the flow direction of the float is called "B-type glass preform". Furthermore, regarding dimension of these glass preforms 31 to 33 and 41, length $L_0$ is 2000 mm, width $W_0$ is 600 mm, and thickness $t_0$ is, 3 mm, for example.

Figure 2:
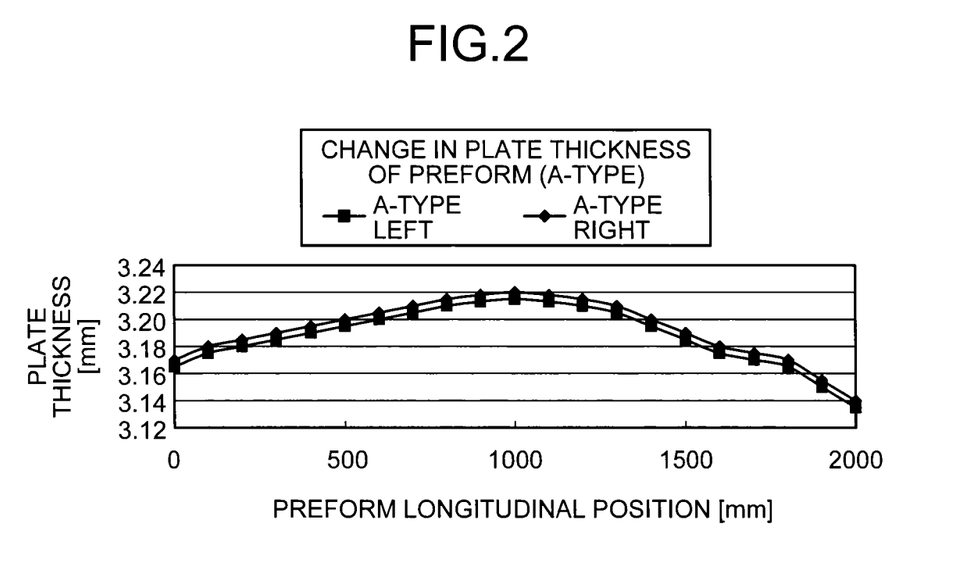
FIG. 2 is a graph showing plate thickness profile along the longitudinal direction of an A-type glass preform according to the embodiment of the present invention.
Figure 3:
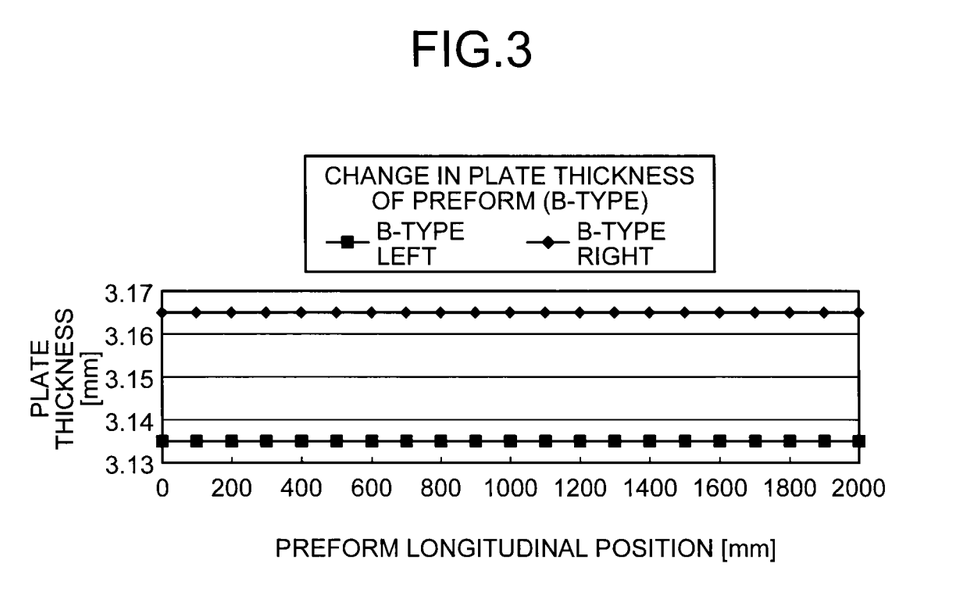
FIG. 3 is a graph showing plate thickness profile along the longitudinal direction of a B-type glass preform as a comparison example according to the embodiment of the present invention.

FIG. 2 shows the result of measuring the thickness of the A-type glass preform 31 in its longitudinal direction, at two end portions in its width direction, that is, lateral end portions (arrow portions of the solid line and the dotted line in FIG. 1) respectively relative to the longitudinal direction. FIG. 3 shows the result of measuring thickness of the B-type glass preform 41 in its longitudinal direction, at lateral end portions relative to the longitudinal direction respectively. Furthermore, the dotted-line arrow shown in FIG. 1 indicates a left end portion relative to the longitudinal direction, and the solid-line arrow indicates a right end portion relative to the longitudinal direction.

It is understood from FIG. 2 that the plate thickness profile of the A-type glass preform 31 varies along the longitudinal direction at both of the left end portion and the right end portion relative to the longitudinal direction, i.e., increases from 3.16 mm to 3.22 mm at maximum and decreases from this maximum value to 3.14 mm. That is, the plate thickness profile of the A-type glass preform 31 is found to be in a mountain-shape in its longitudinal direction.

In contrast, it is understood from FIG. 3 that, the plate thickness profile of the B-type glass preform 41 is approximately constant at about 3.135 mm along the longitudinal direction at the left end portion relative to the longitudinal direction and remains approximately constant at 3.165 mm along the longitudinal direction at the right end portion relative to the longitudinal direction. That is, it is understood that the plate thickness of the B-type glass preform 41 is approximately constant along the longitudinal direction of the glass preform 41 at the left end portion and the right end portion respectively.

In addition, it is understood from FIG. 2 that difference of the thicknesses of the A-type glass preform 31 at the left end portion and at the right end portion relative to its longitudinal direction is very small. On the other hand, it is understood from FIG. 3 that difference of the thicknesses of the B-type glass preform 41 at the left end portion and at the right end portion relative to its longitudinal direction is greater than those of the A-type glass preform 31.

The reason for the thickness profile thus formed is considered as follows. That is, when forming the float plate 10 by the float method, molten glass when being fed onto metal tin exhibits behavior as fluid. Therefore, change in the thickness along the feed direction of the molten glass, i.e., the feed direction of the float is small, and on the other hand, change in the thickness along a direction perpendicular to the feed direction of the float is great. For this reason, in the whole float plate 10, the thickness tends to be approximately constant when being along the feed direction of the float, and on the other hand, the thickness tends to vary to a great degree when being along the direction perpendicular to the feed direction of the float. That is, difference of the plate thicknesses of the A-type glass preform 31 is great when being along the longitudinal direction, but small when being along the width direction. On the other hand, difference of the plate thicknesses of the B-type glass preform 41 is small when being along the longitudinal direction, but is great when being along the width direction.

Based on the above described study, and since other glass preforms 32 and 33 are supposed to be cut out from the float plate 10 in this order along the feed direction of the float as shown in FIG. 1, the inventor of the present invention further imagined that the glass preforms 32 and 33 would resemble the glass preform 31 in shape. That is, the other A-type glass preforms 32 and 33 also have greater change in the plate thickness profiles and in the thickness difference along their longitudinal directions, and on the other hand, the other A-type glass preforms 32 and 33 also have smaller change in the plate thickness profiles and in the thickness difference along their width directions. In addition, tendency of the plate thickness profile of the glass preform 32 cut out from the adjacent glass preform 31 resembles tendency of the plate thickness profile of the glass preform 31, and tendency of the plate thickness profile of the glass preform 33 resembles tendency of the plate thickness profile of the glass preform 32. As described above, the A-type glass preforms 31, 32, and 33 being adjacent to each other and cut out from the same float plate 10 are supposed to coincide with each other approximately in their shapes or plate thickness profiles.

Incidentally, when manufacturing a sheet glass by the re-draw method of which detail will be explained later, a glass preform is supposed to be extended in the longitudinal direction. In this manufacturing, ordinarily, strip thickness distribution of a sheet glass herein manufactured reflects the plate thickness profile of a glass preform in the width direction to a great degree, and on the other hand, the strip thickness distribution of the sheet glass herein manufactured is capable of alleviating the influence of the plate thickness profile in the longitudinal direction. Therefore, in this embodiment, the A-type glass preforms 31, 32, and 33 are used to produce a sheet glass because the plate thickness in the width direction is approximately constant and changes small.

Figure 4:
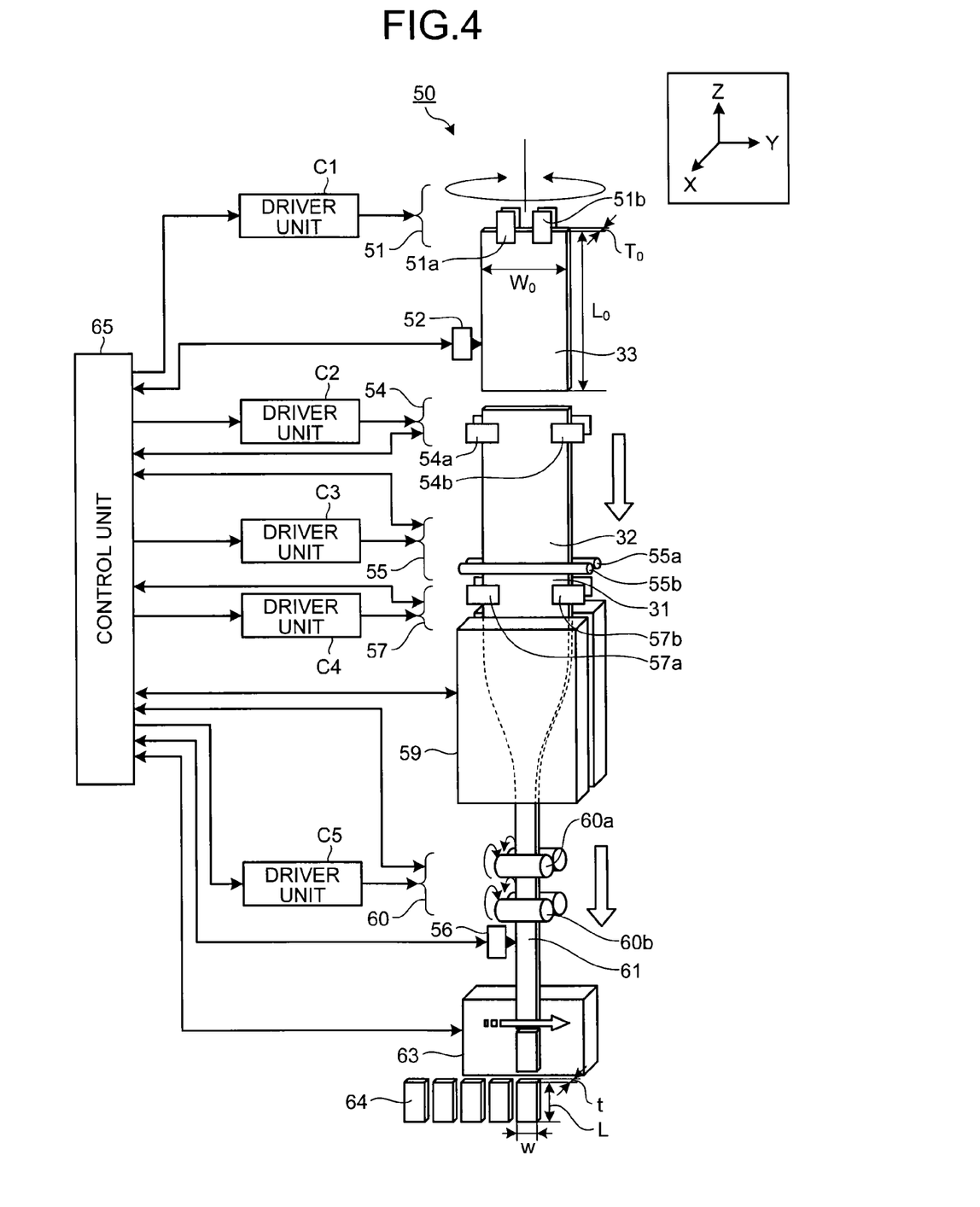
FIG. 4 is a schematic view showing a general configuration of a sheet-glass-manufacturing apparatus adopting the re-draw method according to the embodiment of the present invention.

Next, a sheet-glass-manufacturing apparatus according to the embodiment of the present invention and a method of manufacturing a sheet glass by using this sheet-glass-manufacturing apparatus will be explained. FIG. 4 is a schematic view of a sheet-glass-manufacturing apparatus adopting the re-draw method according to this embodiment.

As shown in FIG. 4, the sheet-glass-manufacturing apparatus 50 adopting the re-draw method has an upper holder unit 51, a center holder unit 54, a connection heater unit 55, a lower holder unit 57, a heating furnace 59, a pull-in capstan 60, and a cutter 63. Furthermore, the sheet-glass-manufacturing apparatus 50 is provided with driver units C1, C2, C3, C4, and C5 driving the upper holder unit 51, the center holder unit 54, the connection heater unit 55, the lower holder unit 57, and the pull-in capstan 60 respectively. In addition, the sheet-glass-manufacturing apparatus 50 is provided with a control unit 65 controlling these units, the driver units C1 to C5 driving these units, the heating furnace 59, and the cutter 63. Furthermore, the sheet-glass-manufacturing apparatus 50 is provided with a plate thickness measurement unit 52 and a strip thickness measurement unit 56 as various kinds of measurement means. The plate thickness measurement unit 52 is disposed beneath the upper holder unit 51 or above the center holder unit 54, and is a preform-thickness measurement unit measuring the thicknesses of the glass preforms 31 to 33. In addition, the strip thickness measurement unit 56 is disposed beneath the pull-in capstan 60 and is a strip thickness measurement apparatus measuring the thickness of the formed re-draw strip 61. Furthermore, values measured by these plate thickness measurement unit 52 and the strip thickness measurement unit 56 respectively are supplied to the control unit 65 as data.

In the sheet-glass-manufacturing apparatus 50, the upper holder unit 51 has two pairs of holder units 51a and 51b holding a rear end (upper end) of the glass preform 33. These holder units 51a and 51b are configured to be rotatable by the driver unit C1 controlled by the control unit 65 by a predetermined angle around an axis (Z direction) in the longitudinal direction of the glass preform 33. In addition, the upper holder unit 51 compensates for the position of the glass preform 33 in the thickness direction (X direction) or the width direction (Y direction) by the driver unit C1. Furthermore, when compensating for position, the driver unit C1 causes the upper holder unit 51 to move in the thickness direction (X direction) or to rotate the glass preforms 31 to 33. In addition, the plate thickness measurement unit 52 provided above the center holder unit 54 measures the plate thickness of the glass preform 33, which is being moved, along its longitudinal direction.

The center holder unit 54 has two pairs of holder units 54a and 54b holding the left end portion and the right end portion in the width direction of the rear end of the glass preform 32. These holder units 54a and 54b are configured to be movable in the vertical direction (Z direction) by the driver unit C2 controlled by the control unit 65. The glass preform 32 compensated for its position by the upper holder unit 51 is held by these holder units 54a and 54b, thus, it is possible to move the glass preform 33 in the feed direction (−Z direction).

The connection heater unit 55 moves in synchronization with the movement, in a feed direction, of a connecting portion of the preceding glass preform 31 and the glass preform 32 subsequently fed after the glass preform 31. This movement is performed by the driver unit C3 controlled by the control unit 65. The connection heater unit 55 includes a pair of connection heaters 55a and 55b arranged symmetrically so that the connection heaters 55a and 55b place connecting portions of the glass preforms 32 and 33 in the vicinity of connecting portions of the glass preform 31 and the glass preform 32 in the thickness direction. This symmetric arrangement of the pair of the connection heaters 55a and 55b makes a profile of increase in temperature in the thickness direction of the glass preforms 31 and 32 symmetric or makes glass viscosity profile symmetric, thus warpage caused by asymmetry in the thickness direction can be restrained.

The lower holder unit 57 has two pairs of holder units 57a and 57b holding a rear end portion of the glass preform 31 actually supplied to the heating furnace 59. The respective holder units 57a and 57b pinch and hold the glass preform 31 at the left end portion and the right end portion of the glass preform 31 in the thickness direction. The lower holder unit 57 is moved and controlled so as to be capable of feeding the glass preforms 31 to 33 sequentially into the heating furnace 59 by the driver unit C4 controlled by the control unit 65. In addition, heaters (not shown) are provided at portions respectively where the two pairs of the holder units 57a and 57b, when holding the glass preform 31, make contact with the glass preform 31. These heaters are temperature-controlled by the control unit 65 so as to reach to temperature close to that of the glass preform 31 being held.

The control unit 65 controls and drives the driver units C2 and C4 for these center holder unit 54 and the lower holder unit 57 respectively, thus the speed at which the glass preform is fed into the heating furnace 59 is controlled. Furthermore, the rear end of the preceding glass preform 31 and the front end of the succeeding glass preform 32 are butt-joined. The portions connected by butt-joint are welded by the connection heater unit 55, and also the speed in case of feeding the glass preforms 31 and 32 into the heating furnace 59 continuously is controlled by the control unit 65.

The heating furnace 59, into which the glass preform 31 is fed, is an electric resistance furnace configured to be capable of heating the glass preform 31 from its two sides. Provided inside the heating furnace 59 is a heater (not shown) as a heating apparatus heating the glass preform 31.

The pull-in capstan 60 provided at a pulling side of the heating furnace 59 has two pairs of rollers 60a and 60b pulling, and while extending, the glass preform 31. The respective rollers 60a and 60b are configured to be capable of being rotated and driven by the driver unit C5 controlled by the control unit 65. In addition, since the control unit 65 controls the rotation speed of the respective rollers 60a and 60b, pull-in speed at which the glass preform 31 is pulled while being extended is controlled. In addition, the strip thickness measurement unit 56 disposed at a down-stream side with respect to the glass preform 31 being pulled and beneath the pull-in capstan 60 measures the strip thickness of a re-draw strip 61 obtained after the glass preform 31 was extended. The strip thickness herein measured corresponds to the plate thickness of the sheet glass 64 which will be explained later.

After the glass preform 31 is extended by the pull-in capstan 60 and formed to a re-draw strip 61, this re-draw strip 61 is cut by the cutter 63 by a predetermined length L (mm), thus a sheet glass 64 is manufactured. Furthermore, regarding dimension of the sheet glass 64 manufactured in this embodiment, length L is 300 mm, width W is 110 mm, and thickness t is 0.825 mm, for example.

Furthermore, although the re-draw strip 61 is cut by the cutter 63 to manufacture the sheet glass 64 in this embodiment, in case where the re-draw strip is sufficiently flexible, the re-draw strip may be wound, in state of not being cut, around a reel to produce the sheet glass 64.

Next, a control method when manufacturing the sheet glass 64 by using the sheet-glass-manufacturing apparatus 50 configured as above according to this embodiment will be explained.

At first, a method of controlling feed speed for the glass preforms 31 to 33 by the center holder unit 54 and the lower holder unit 57 and pull-in speed for the glass preforms 31 to 33 by the pull-in capstan 60 by feed-forward control is explained. FIG. 5 is a graph showing measurement position for the plate thickness of the glass preform, a graph of plate thickness profile along the longitudinal direction of the glass preform, and the strip thickness profile of the re-draw strip 61 corresponding to the glass preform. Furthermore, a connection loss portion 31a, used when being connected to another glass preform, exists at two end portions (front-and-rear ends) in the longitudinal direction of the glass preform 31 as shown in FIG. 5A.

In addition, of the glass preform 31, difference of thicknesses in plate thickness profile along the width direction is small, and on the other hand, plate thickness difference D of the plate thickness profile along the longitudinal direction is great. When the inventors measured, the plate thickness difference D of the glass preform 31 used in this embodiment was approximately 250 μm. Furthermore the plate thickness difference D is not necessarily limited to this value.

In addition, since the glass preform 31 is extended by the pull-in capstan 60 to be formed to the re-draw strip 61, the strip thickness profile along the longitudinal direction of the re-draw strip 61 usually reflects the plate thickness profile along the longitudinal direction of the glass preform 31. Based on that, this embodiment reduces strip thickness difference of strip thickness profile along the longitudinal direction of the re-draw strip 61 by controlling at least one of feed speed and pull-in speed for the glass preforms 31 to 33 by the control unit 65.

Figure 5A:
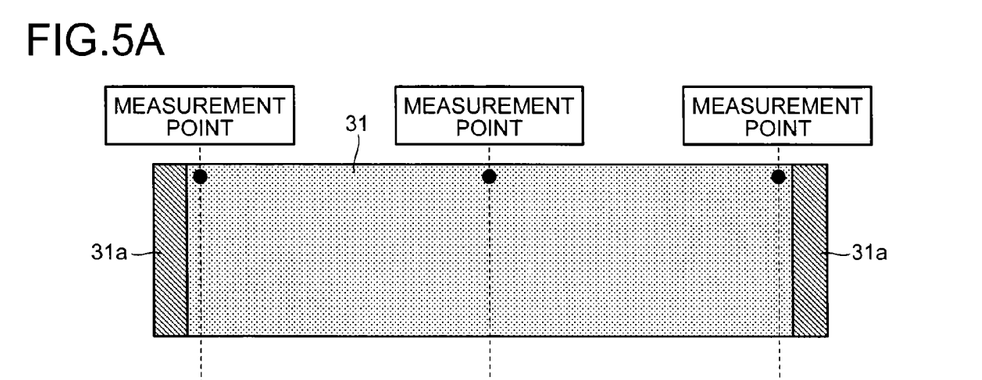
FIG. 5A is a glass preform in which positions is measured in the embodiment of the present invention.
Figure 5B:
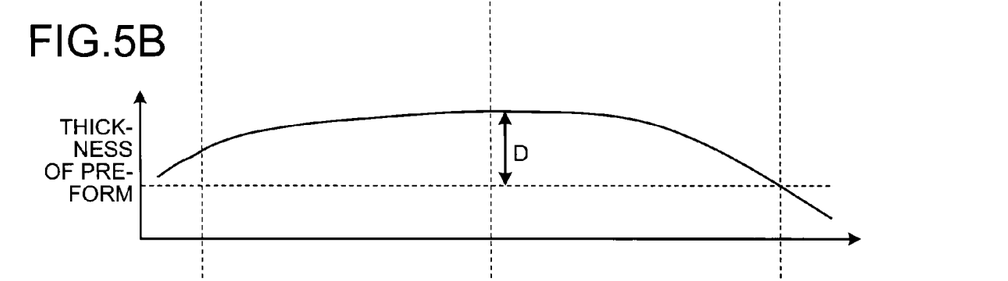
FIG. 5B is a graph of plate thickness profile of the glass preform along the longitudinal direction of the glass preform.
Figure 5C:
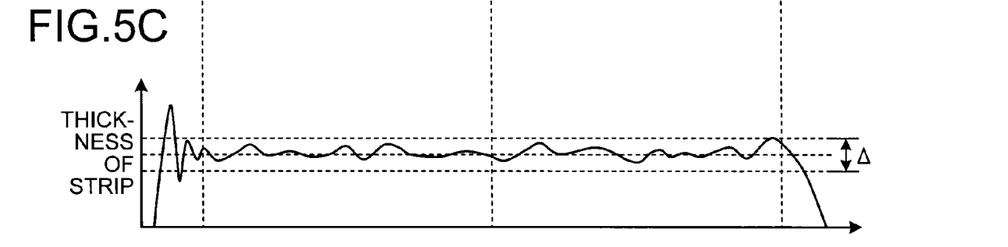
FIG. 5C is a graph of strip thickness profile of a sheet glass correspond to the longitudinal direction of the glass preform.

That is, at first, as shown in FIG. 5A, the plate thickness profile of the glass preform 31 is measured along the longitudinal direction by the plate thickness measurement unit 52. Hereby data for the plate thickness profile along the longitudinal direction of the glass preform 31 can be obtained. Furthermore, as described above, the plate thickness profiles of the A-type glass preforms 31 being cut out adjacently coincide with each other approximately. Therefore, after the plate thickness profile is measured temporarily, thickness is measured at least at three points by the plate thickness measurement unit 52 based on this plate thickness profile, and then the measured value of the plate thickness is shifted, thereby the plate thickness profile of the glass preform 31 can be derived. FIG. 5B shows data for obtained plate thickness profile of the glass preform 31. Data of the plate thickness profile of this glass preform 31 are supplied from the plate thickness measurement unit 52 to the control unit 65.

Next, the control unit 65 performs feed-forward control on the feed speed V and the pull-in speed v for the glass preform 31 based on data, of the plate thickness profile of the glass preform 31, supplied from the plate thickness measurement unit 52 so that variation in the strip thickness of the re-draw strip 61 is reduced. This control is executed by relating the feed speed V and the pull-in speed v for the glass preform 31 based on desirable strip thickness of the re-draw strip 61 (target strip thickness) and the plate thickness profile of the glass preform 31.

More specifically, the relationship between the feed speed V (mm/min) of plate thickness T (mm) of the glass preform and the pull-in speed v (m/min) in case that the re-draw strip 61 is of strip thickness t (mm) can be described by Numerical Formula (1) as follows. This Numerical Formula (1) is preferably applicable to a case where an aspect ratio (ratio of plate thickness and width) of a cross section perpendicular to the longitudinal direction of the glass preform is equal to an aspect ratio (ratio of strip thickness and strip width) of a cross section perpendicular to the longitudinal direction of the re-draw strip 61.

[Numerical Formula 1]

$$v = \frac{1}{1000}\left(\frac{T}{t}\right)^2 V \quad (1)$$

Furthermore, when manufacturing the sheet glass 64, since the target strip thickness of the re-draw strip 61 is constant (t: constant), relationship between the feed speed V and the pull-in speed v of the glass preform 31 is described also by Numerical Formula (2) as follows.

[Numerical Formula 2]

$$\frac{v}{V} \propto T^2 \quad (2)$$

As shown in Numerical Formula (2), the ratio of the pull-in speed v to the feed speed V of the glass preform 31 is in proportion to the square of the plate thickness of the glass preform 31.

Thereby the control unit 65 in this embodiment performs feed-forward control, based on the plate thickness profiles of the glass preforms 31 to 33 and in response to the fluctuation of its plate thickness T, so that at least one of the feed speed V and the pull-in speed v of the glass preform 31 satisfies Numerical Formula (1). That is, both the feed speed V of the glass preform 31 and the pull-in speed v of the re-draw strip 61 may be controlled variably, otherwise, one of the speeds may be controlled to be fixed and constant and the other one of the speeds may be controlled variably.

Herein, in this embodiment, in order to restrain generation of waviness of the glass substrate as a final product by reducing twist in the glass preform 31 inside etc. the heating furnace 59, it is preferable that the control unit 65 controls so that, while the feed speed V of the glass preform 31 is constant, the pull-in speed v is variably controlled. In case of controlling the pull-in speed v variably in this manner, feed-forward control is executed as follows. That is, in case of extending a relatively thick portion of the plate thickness profile of the glass preform 31, the pull-in speed v of the pull-in capstan 60 is increased so as to be able to pull up quickly, so that the strip thickness of the formed re-draw strip 61 is reduced to approximate to the target value. In contrast, in case of extending a relatively thin portion of the plate thickness profile of the glass preform 31, the pull-in speed v is decreased so as to pull up slowly and to a small degree, so that the strip thickness of the formed re-draw strip 61 is increased to approximate to the target value. In addition, the pull-in speed v is changed in this manner at a predetermined interval of feed, more specifically, for example, 50 mm, of the glass preform 31.

Figure 6:
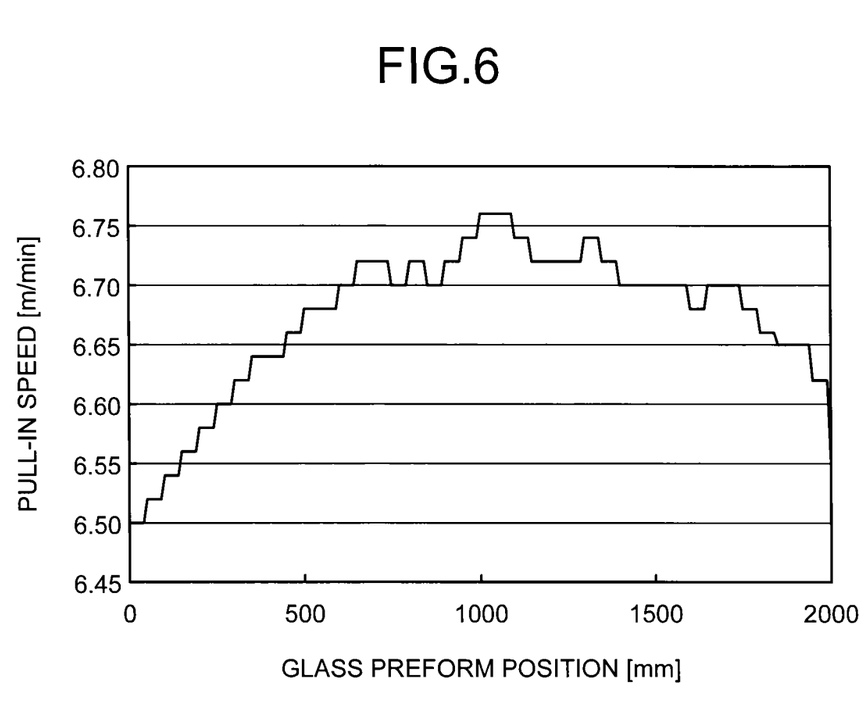
FIG. 6 is a graph showing pull-in speed control along the length of a preform by a sheet-glass-manufacturing apparatus according to the embodiment of the present invention.

FIG. 6 is a graph showing a specific example of transition of pull-in speed v changed and controlled in this manner. Furthermore FIG. 6 shows the pull-in speed v which corresponds to the position from the front end of the glass preform 31 along the longitudinal direction. As shown in FIG. 5B and FIG. 6, in a portion where the glass preform 31 is thin and the plate thickness is small along the longitudinal direction of the glass preform 31, the control unit 65 controls so that the pull-in speed v by the pull-in capstan 60 is slow. Hereby the strip thickness t of the formed re-draw strip 61 increases and the plate thickness of the manufactured sheet glass 64 approximates the target value. On the other hand, in a portion where the glass preform 31 is thick and the plate thickness is great, the control unit 65 controls so that the pull-in speed v by the pull-in capstan 60 increases. Hereby the strip thickness t of the formed re-draw strip 61 decreases and the plate thickness of the manufactured sheet glass 64 approximates the target value.

As described above, by controlling the pull-in speed v corresponding to the plate thickness profile of the glass preform 31, it is possible to restrain the plate thickness profile of the glass preform 31 from being reflected on the strip thickness profile of the formed re-draw strip 61 directly, and thus, the difference of strip thicknesses in the strip thickness profile of the re-draw strip 61 can be narrowed. Furthermore, in case of forming the re-draw strip 61 by using a glass preform 31 similar to the glass preform 31 used in the embodiment and by maintaining the feed speed V and the pull-in speed v of the glass preform 31 constantly, as shown in FIG. 5C, the strip thickness difference Δ along the longitudinal direction of the re-draw strip 61 formed by a portion which is other than the connection loss portion 31a of the glass preform 31 was 30 to 40 μm at maximum. In contrast to this, in this embodiment, it was confirmed that, by controlling the pull-in speed v by the control unit 65 based on the plate thickness profile, along the longitudinal direction of the glass preform 31, measured previously by the plate thickness measurement unit 52, as shown in FIG. 5C, the strip thickness difference Δ of the re-draw strip 61 formed by the portion which is other than the connection loss portion 31a of the glass preform 31 is equal to or smaller than 20 μm.

Figure 7:
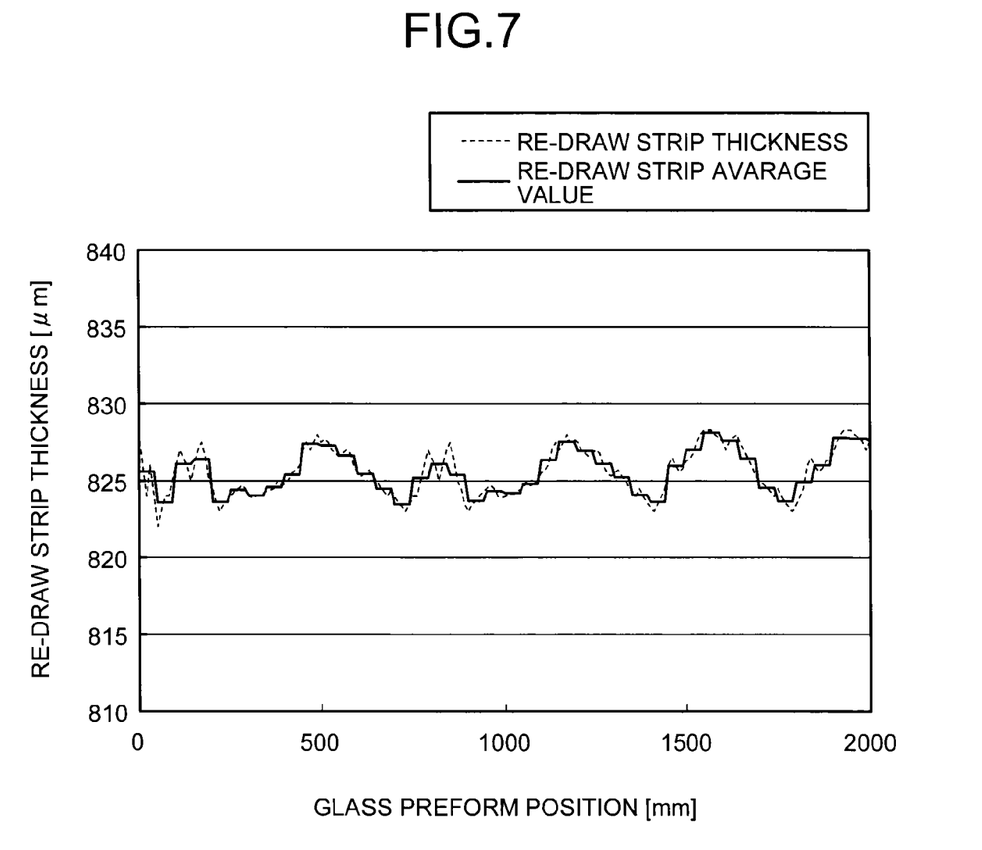
FIG. 7 is a graph showing change in strip thickness of a sheet glass manufactured by a sheet-glass-manufacturing apparatus adopting the re-draw method according to the embodiment of the present invention.

Next, a control method of executing feed-back control focusing on the pull-in speed v for further reducing non-uniformness in the strip thickness t of the re-draw strip 61 will be explained. FIG. 7 is a graph, for explaining feed-back control by this embodiment, showing measured values and average values of the strip thickness t of the re-draw strip 61 at positions along the longitudinal direction of the glass preform 31.

At first, as shown in FIG. 7, change in the strip thickness of the re-draw strip 61 formed by using a piece of glass preform 31 is measured (dotted line in FIG. 7). Next, based on the measured change in the strip thickness of the re-draw strip 61, the control unit 65 calculates average values of the strip thickness of the re-draw strip 61 at a predetermined interval at which the glass preform 31 is fed along the longitudinal direction, for example, 50 mm (solid line in FIG. 7). Next, the control unit 65 calculates difference between the calculated average value of the strip thickness t of the re-draw strip 61 and the target strip thickness of the re-draw strip 61. In FIG. 7, in case that the target strip thickness of the re-draw strip 61 was 825 μm for example, the control unit 65 calculates difference between the average value (solid line in FIG. 7) of the strip thickness of the re-draw strip 61 and 825 μm.

Subsequently, the control unit 65 calculates a value for compensating for the pull-in speed v, by the pull-in capstan 60 when forming the re-draw strip 61, based on the difference between this calculated average value of the strip thickness and the target strip thickness. Furthermore this value for compensating for the pull-in speed v is calculated at an interval of calculating the above-described average value of the strip thickness t of the re-draw strip 61, i.e., every time the glass preform 31 is fed by 50 mm, for example.

More specifically, in case that the calculated average value of the strip thickness of the re-draw strip 61 is greater than the target strip thickness, the control unit 65 calculates and sets, based on the difference, the value for compensation to be greater than the pull-in speed v when forming the re-draw strip 61 from the glass preform 31. In contrast, in case that the calculated average value of the strip thickness of the re-draw strip 61 is smaller than the target strip thickness, the control unit 65 calculates and sets, based on the difference, the value for compensation to be smaller than the pull-in speed v when forming the re-draw strip 61 from the glass preform 31.

In addition, these values compensating for the pull-in speed v is calculated over the entire length of the glass preform 31 when using the glass preform 31 to form the re-draw strip 61. After that, change in the pull-in speed v at which the re-draw strip 61 was formed from the glass preform 31 is fed back, thus change in new pull-in speed v, to which the values for compensation were applied, is set. Then, this change in the pull-in speed v is applied to pull-in speed v when forming the re-draw strip 61 from the glass preform 32 fed subsequent to the preceding glass preform 31.

As described above, since the glass preforms 31 to 33, which are adjacent to each other, are cut out from a same float plate 10 continuously, the plate thickness profile of the preceding glass preform 31 and the plate thickness profile of the succeeding glass preform 32 have the same tendencies substantially. Therefore, the pull-in speed v of the glass preform 32 can be optimized by applying and feeding back the values, compensating for the pull-in speed v, calculated based on the strip thickness profile of the re-draw strip 61 formed from the preceding glass preform 31 to the pull-in speed v of the subsequent glass preform 32. Hereby the strip thickness of the re-draw strip 61 can approximate to the target strip thickness. As described above, since the A-type glass preforms 31 to 33 are adopted, feed-back control of the pull-in speed v can be executed more effectively by supplying the glass preforms 31 to 33 to the sheet-glass-manufacturing apparatus 50 sequentially in the order of being disposed adjacently in the float plate 10.

Figure 8:
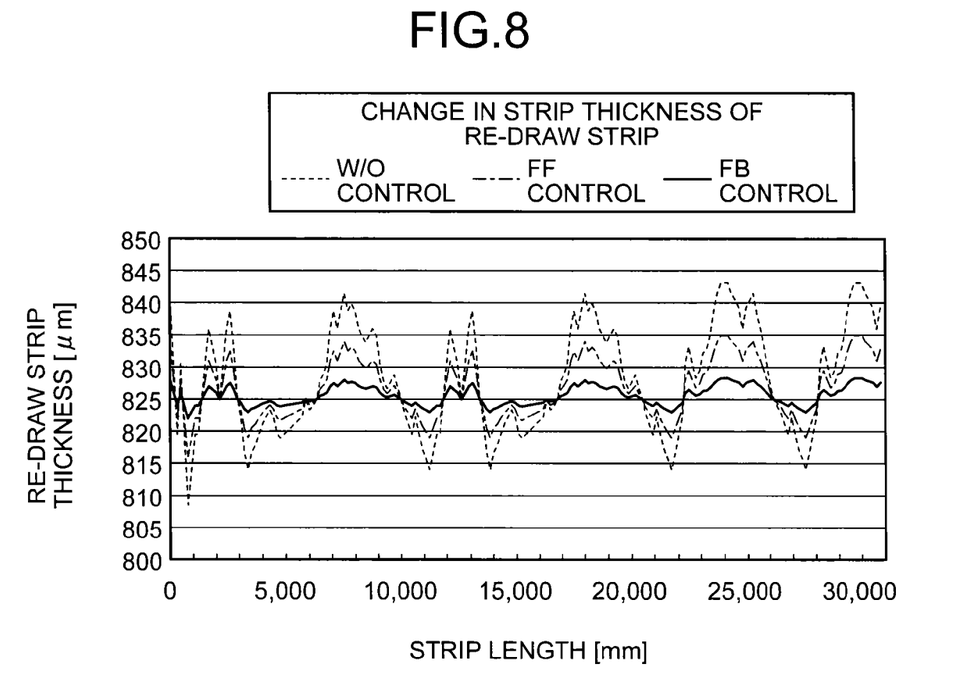
FIG. 8 is a graph showing strip thickness profile along the longitudinal direction of a re-draw strip manufactured based on a control method according to the embodiment of the present invention.

FIG. 8 shows the strip thickness profiles of the manufactured re-draw strip in the longitudinal direction in case of executing the above-described feed-forward control (FF control), in case of executing the feed-back control (FB control), and in case of maintaining the feed speed of the glass preform and the pull-in speed of the glass preform constantly.

As shown in FIG. 8, in case of not executing feed-forward control and feed-back control, there is a part (dotted line part in FIG. 8) in which shift amount from the target value is equal to or greater than 15 μm. In contrast to this, equal to or smaller than 10 μm of shift amount was possible by executing the feed-forward control (dash dotted lines in FIG. 8), and it was possible to reduce the shift amount to equal to or smaller than 5 μm by further executing the feed-back control (solid line parts in FIG. 8).

Next, a glass substrate formed from the sheet glass manufactured by the sheet-glass-manufacturing apparatus 50 as described above will be explained.

Figure 9:
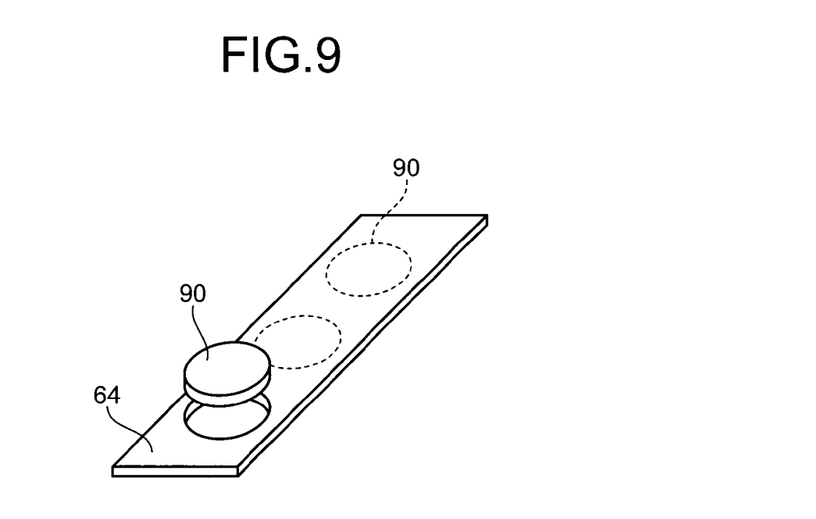
FIG. 9 is a diagrammatic view for explaining a method of coring a glass substrate from a sheet glass manufactured according to the embodiment of the present invention.

At first, a flat and disc-shaped glass substrate 90 shown in FIG. 9 is casted from a sheet glass 64 manufactured in the above-described manner by executing a known coring process. In the coring process, the flat and disc-shaped glass substrates 90 are cut out sequentially in one line from the manufactured sheet glass 64 so that the center of the glass substrate 90 is positioned on the center in the width direction of the sheet glass 64 substantially.

Figure 10:
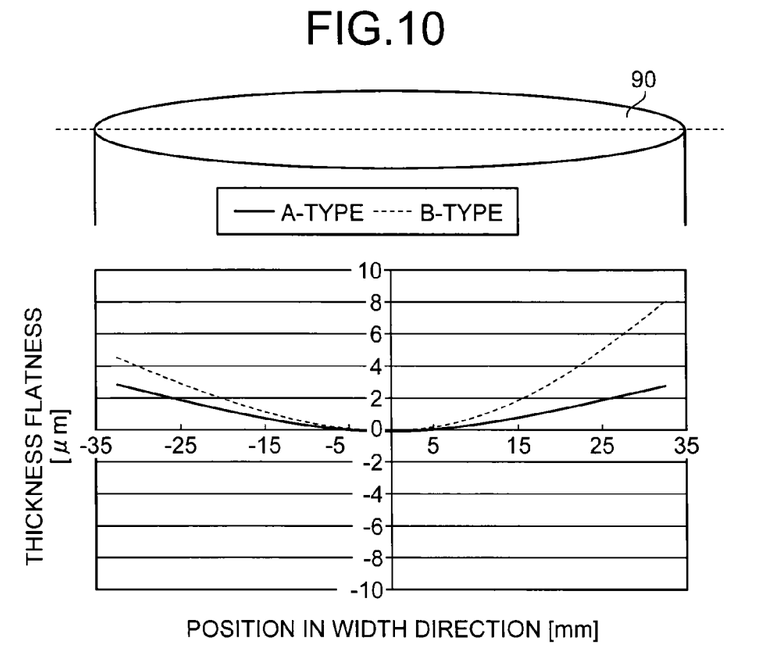
FIG. 10 is a graph showing thicknesses along the width direction of a glass substrate manufactured by the method of manufacturing a glass substrate according to the embodiment of the present invention and a glass substrate manufactured by conventional art.
Figure 11:
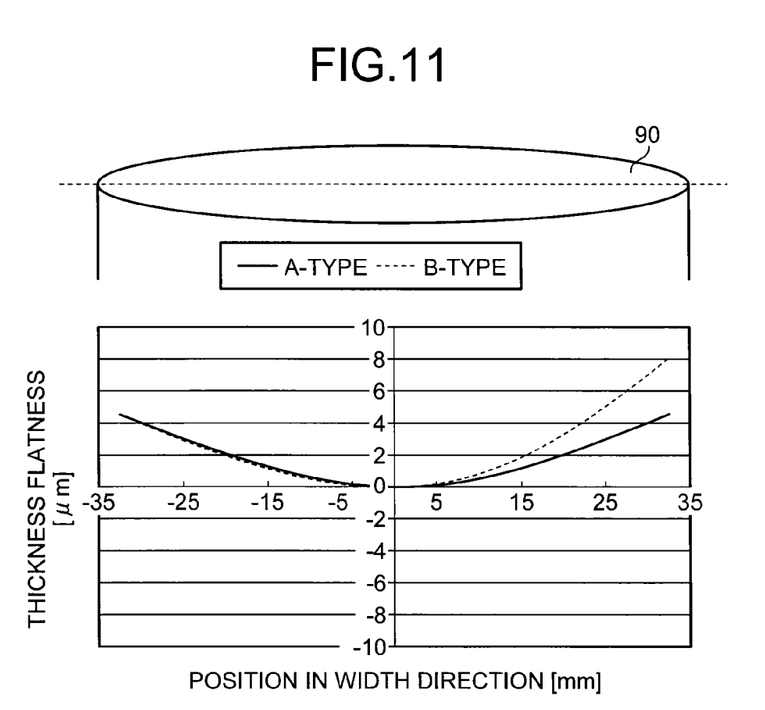
FIG. 11 is a graph showing thicknesses along the width direction of a glass substrate manufactured by the method of manufacturing a glass substrate according to the embodiment of the present invention and a glass substrate manufactured by conventional art.

Furthermore the flat and disc-shaped glass substrate 90 not having a hole at the center portion was used here; a doughnut-shaped glass substrate having a round hole at the center portion may be used. FIG. 10 and FIG. 11 show results of measuring plate thickness profiles which are equivalent to the width direction of the sheet glasses 64 of two arbitrarily-selected glass substrates 90 in case that one of the glass substrates 90 was manufactured by using the A-type glass preform 31 and the other one of the glass substrates 90 was manufactured by using the B-type glass preform 41. Furthermore, in any case, a sheet glass was used which was manufactured by maintaining the feed speed and the pull-in speed of the glass preform constantly without executing the feed-forward control and the feed-back control. Since the above-described feed-forward control or feed-back control improves the plate thickness profile by reducing the plate thickness difference along the direction in which the sheet glass 64 is extended and thus do not affect the plate thickness difference along the width direction, similar results can be obtained even in case of executing feed-forward control or feed-back control.

It is understood from FIG. 10 that the plate thickness difference of the glass substrate 90 manufactured from the B-type glass preform 41 is approximately 8 μm, and in contrast to this, the plate thickness difference at two sides of the glass substrate 90 manufactured from the A-type glass preform 31 adopted in this embodiment has improved to approximately 3 μm. In addition, it is understood from FIG. 11 that the plate thickness difference of the glass substrate 90 manufactured from the B-type glass preform 41 is approximately 8 μm, and in contrast to this, the plate thickness difference at two sides of the glass substrate 90 manufactured from the A-type glass preform 31 has improved to approximately 4.5 µm. That is, it was confirmed that variation of the plate thickness of the glass substrate 90 can be reduced to a great degree and uniformness of the plate thickness improves by manufacturing the glass substrate 90 by using the sheet glass 64 manufactured from the A-type glass preforms 31 to 33 by the re-draw method. Furthermore, the glass substrate 90 as a product is manufactured by executing known edge-forming process, end-surface-polishing process, and primary-surface-grinding process to the glass substrate 90 casted in the above-described manner.

According to the above described embodiment of the present invention, it is possible to reduce variation in the plate thickness along the width direction of a sheet glass manufactured from a glass preform so that this glass preform used for manufacturing the sheet glass is the glass preform cut out so that the longitudinal direction is in 90 degrees with respect to the feed direction of the molten glass when manufacturing the float plate to maintain the plate thickness along the width direction of the glass preform constantly. In addition, since it is possible to prevent the plate thickness profile varying to a relatively greater degree along the longitudinal direction of the glass preform from being reflected on the strip thickness profile of the re-draw strip directly by controlling the feed speed or the pull-in speed of the glass preform based on this plate thickness profile; thus a desirable plate thickness of the sheet glass excellent in the uniformness of the plate thickness can be manufactured; therefore, variation in the plate thickness of the glass substrate as a final product can be reduced to a great degree and the uniformness of the plate thickness of the glass substrate can be improved furthermore.

As described above, although the embodiment of the present invention was explained specifically, this invention is not limited to the above-described embodiment, and various modifications are possible based on a technical idea of this invention. For example, values described in the above-described embodiment are mere examples, and values different from these may be used if necessary.

Although, in the above-described embodiment, the plate thickness measurement unit 52 provided to the sheet-glass-manufacturing apparatus 50 is configured to measure the plate thicknesses of the glass preforms 31 to 33 to supply these measured values to the control unit 65, a plate thickness measurement device disposed outside the sheet-glass-manufacturing apparatus 50 may be configured to measure the plate thicknesses of the glass preforms 31 to 33 in advance to supply the measured values to the control unit 65.

In addition, the above-described embodiment is configured to control the pull-in speed of the glass preform 31 by using Numerical Formula (1) according to the plate thickness of the glass preform 31 but not limited to Numerical Formula (1) necessarily, and it is possible to use various numerical formulae according to the plate thickness of the glass preform 31 if it is possible to control the feed speed V and the pull-in speed v of the glass preform 31 at the optimum speed mutually according to the dimension of the glass preform 31 or the desirable dimension etc. of the sheet glass 64.

In addition, although, in the above-described embodiment, the control unit 65 executes feed-back control of the pull-in speed v automatically, this feed-back control can be executed manually. That is, it is possible to execute feed-back control in which, one to three pieces of glass preform is used to form re-draw strips, values compensating for the pull-in speed v are calculated at a predetermined length of feeding the glass preform, e.g. every time the glass preform is fed by 50 mm, based the difference between the strip thickness profiles of these re-draw strips and the target strip thickness of the re-draw strip, and then, based on these values for compensation, the pull-in speed v when forming the re-draw strip 61 from subsequently-fed glass preform 32 is compensated for manually.

In addition, although, in the above-described embodiment, the plate thickness of the glass preform 31 is measured by the plate thickness measurement unit 52 at three points along the longitudinal direction when executing feed-forward control based on the plate thickness profile of the glass preform 31, this measurement of the plate thickness by the plate thickness measurement unit 52 can be executed over the entire length along the longitudinal direction of the glass preform 31.

In addition, although, in the above-described embodiment, it is configured that the pull-in speed v of the glass preform 31 is switched and changed every time the glass preform 31 is fed by 50 mm, the pull-in speed v of the glass preform 31 may be changed successively according to the plate thickness profile of the glass preform 31.

In addition, in the above-described embodiment, it is possible to manufacture the sheet glass by maintaining both the feed speed of the glass preform and the pull-in speed of the glass preform constantly without executing neither one of the feed-forward control and the feed-back control.

The present invention can be used preferably when manufacturing a sheet glass or a glass substrate used for, for example, solar cell modules, semiconductor element substrates, spacers used for field-effect-type flat panel displays, or magnetic disc substrates etc.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing a sheet glass, the method comprising a re-draw process forming a sheet glass by, heating and softening a glass preform manufactured by float method, and extending the glass preform to a desirable plate thickness, wherein
    an extension direction in which the glass preform is extended by the re-draw process is 90 degrees with respect to a direction in which molten glass is fed in the float method.

2. The method according to claim 1, further comprising a control process controlling at least one of feed speed of the glass preform and pull-in speed at which the glass preform is pulled based on plate thickness profile of the glass preform.

3. The method according to claim 1, further comprising a pull-in-speed control process controlling, based on plate thickness profile of the glass preform, pull-in speed at which the glass preform is pulled, wherein
    the pull-in-speed control process comprises a pull-in speed compensation process which comprises
measuring plate thickness profile along the extension direction of the sheet glass formed by a preceding first glass preform, calculating a compensation value compensating for the pull-in speed, at which the first glass preform is pulled, based on profile of difference between the measured plate thickness profile of the sheet glass and a target plate thickness of the sheet glass, and compensating for pull-in speed of a second succeeding glass preform by using the compensation value.

4. The method according to claim 3, wherein the first glass preform and the second glass preform are cut out from positions adjacent in a direction in which molten glass is fed in the float method.

5. A method of manufacturing a glass substrate, the method comprising:

a sheet-glass-manufacturing process of manufacturing a sheet glass by performing a re-draw process of forming the sheet glass by, heating and softening a glass preform manufactured by a float method, and extending the glass preform to a desirable plate thickness, wherein an extension direction in which the glass preform is extended by the re-draw process is 90 degrees with respect to a direction in which molten glass is fed in the float method; and a coring process of coring the sheet glass to form glass substrates in one line so that centers of the glass substrates are positioned substantially on a center of the sheet glass in a width direction.

\* \* \* \* \*